W. B. HOSFORD.
FLEXIBLE COUPLING.
APPLICATION FILED SEPT. 11, 1916.
1,214,307.
Patented Jan. 30, 1917.
3 SHEETS—SHEET 1.
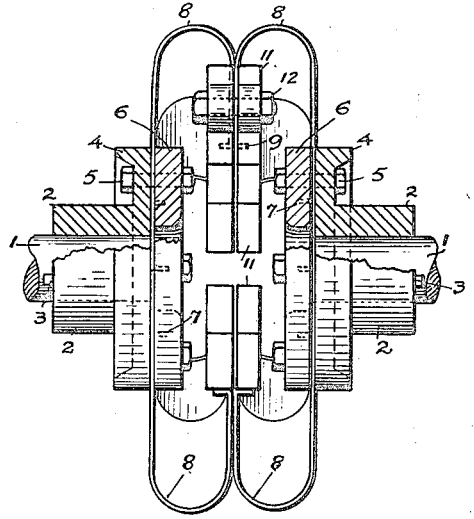
Fig. 1.
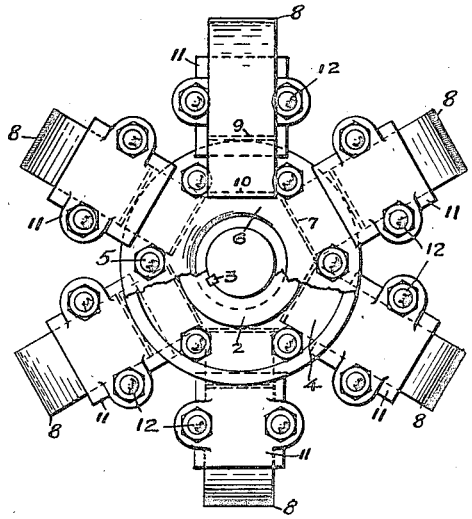
Fig. 2.
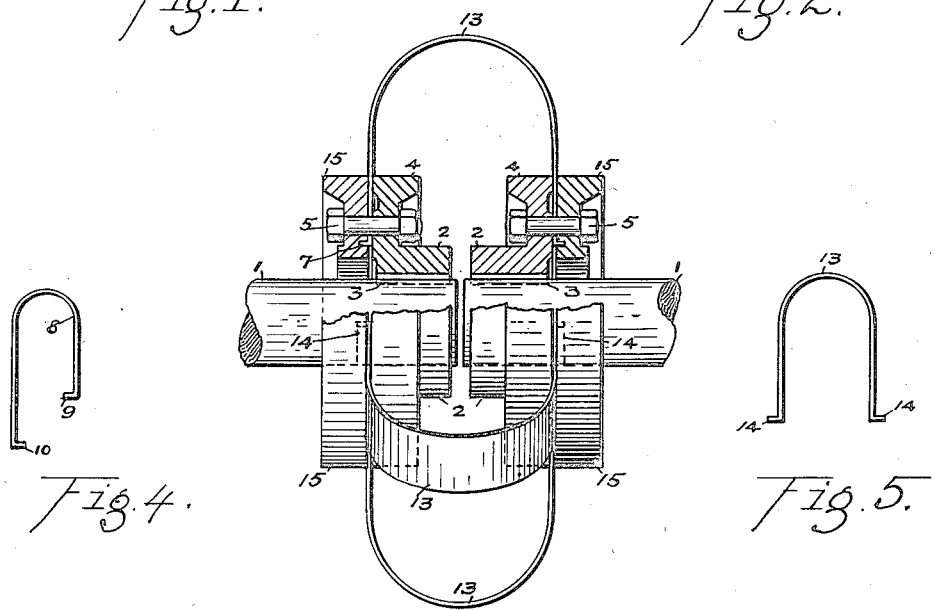
Fig. 4.
Fig. 3.
Fig. 5.
William B. Hosford INVENTOR.
BY H. S. Anstutz
ATTORNEY

W. B. HOSFORD.
FLEXIBLE COUPLING.
APPLICATION FILED SEPT. 11, 1916.

1,214,307.

Patented Jan. 30, 1917.
3 SHEETS—SHEET 2.

William B. Hosford  Inventor

By  N. S. Amstutz

Attorney

W. B. HOSFORD.
FLEXIBLE COUPLING.
APPLICATION FILED SEPT. 11, 1916.
1,214,307.
Patented Jan. 30, 1917.
3 SHEETS—SHEET 3.
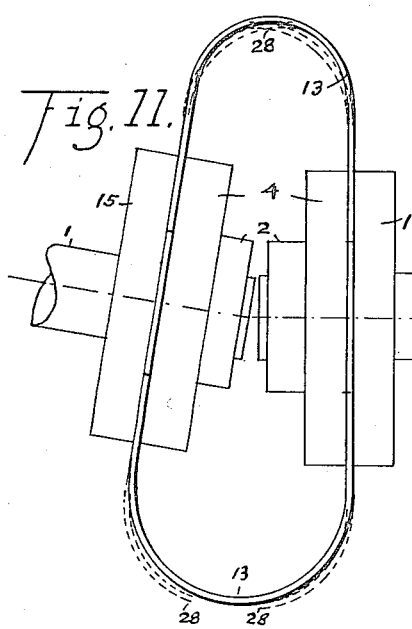
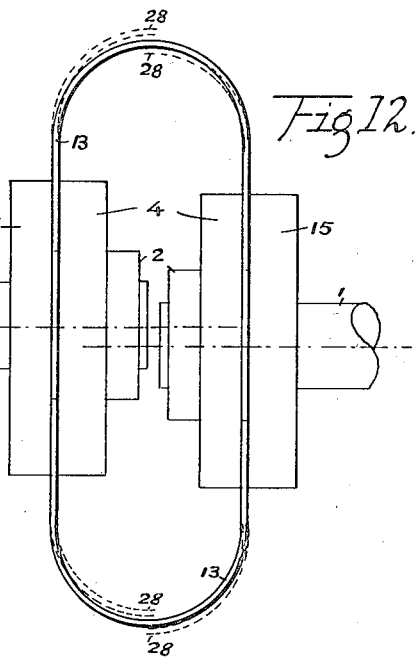
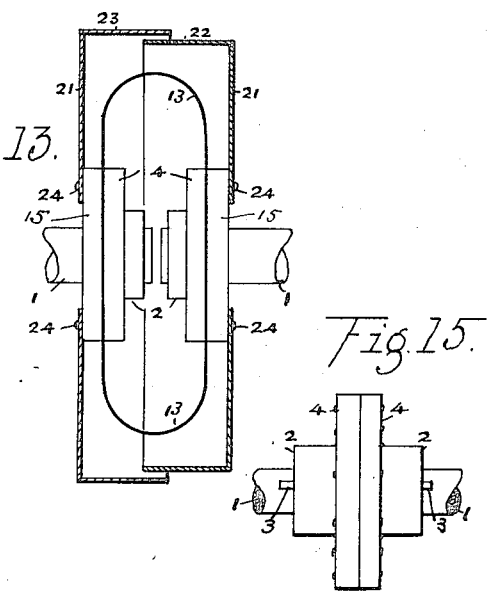
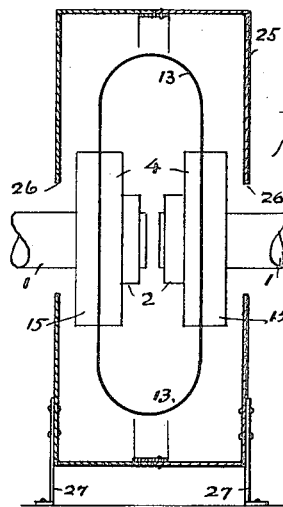

UNITED STATES PATENT OFFICE.

WILLIAM B. HOSFORD, OF MISHAWAKA, INDIANA, ASSIGNOR TO DODGE MANUFACTURING COMPANY, OF MISHAWAKA, INDIANA, A CORPORATION OF INDIANA.

FLEXIBLE COUPLING.

1,214,307.  Specification of Letters Patent.  Patented Jan. 30, 1917.

Application filed September 11, 1916.  Serial No. 119,513.

*To all whom it may concern:*

Be it known that I, WILLIAM B. HOSFORD, citizen of the United States, residing at Mishawaka, in the county of St. Joseph and State of Indiana, have invented certain new and useful Improvements in Flexible Couplings, of which the following is a specification.

My invention relates to improvements in flexible couplings and it comprises the special features pointed out in the annexed claims.

The purpose of my invention is to provide a flexible coupling that has no loose or sliding parts; is economical to manufacture; that will equally adapt itself to positions of off-center alinement as well as to various angular relations the shafts may take to each other; that in certain forms will readily adapt the flexible features to the parts of standard couplings as found in common engineering practice; that may be easily repaired when needed; that may be operated with shafts much out of alinement without impairing the adjacent bearings through excessive friction.

With these and other ends in view I illustrate in the accompanying drawings such instances of adaptation as will disclose the broad underlying principle without limiting myself to the specific details shown.

Figure 6:
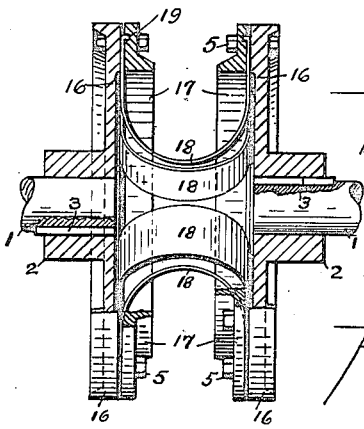
Figure 7:
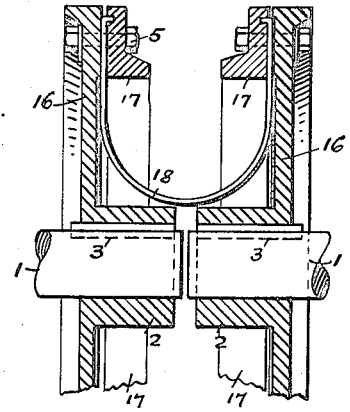
Figure 8:
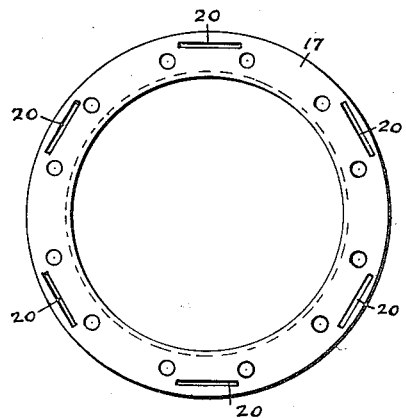
Figure 9:
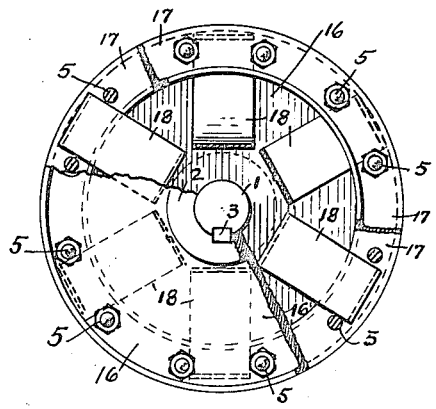
Figure 10:
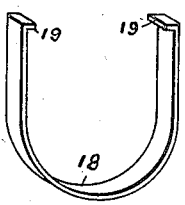

Fig. 1— is an elevation partly in section of duplex elastic connectors used in pairs to join two shaft ends. Fig. 2— is an end elevation of Fig. 1 with portions broken away. Fig. 3— is an elevation similar to Fig. 1 with ordinary coupling heads utilized for the attachment of the elastic connectors. Fig. 4— is an isolated elevation of an elastic connector shown in Fig. 1. Fig. 5— is a similar view of such a connector as used on Fig. 3. Fig. 6— instances the use of shaft-end heads of larger diameter having the hubs external and the elastic connectors projecting toward the center. Fig. 7— is a view similar to Fig. 6 with the hubs facing each other. Fig. 8— is an elevation of a clamping ring. Fig. 9— is an end elevation of Fig. 6. Fig. 10— is a perspective of a single unit connector with retaining toes projecting inward. Fig. 11— is a diagrammatic view showing two shafts at an angle to each other. Fig. 12— is also a diagrammatic view showing two shafts in parallel relation but off-center. Fig. 13— instances the diagrammatic relation of a two-part rotating safety shield when used to inclose outwardly projecting elastic connectors. Fig. 14— is a similar view of a stationary shield secured to the floor or attached to a wall or ceiling. Fig. 15— shows the parts of a standard rigid coupling.

In carrying out my invention I may utilize several different adaptations which are however distinctly analogous. The elastic members used are individual units which may be grouped in pairs or used singly in radial positions between the shaft end heads regardless of the specific location of the elastic portion of the members with respect to the ends by which they are secured to the heads so that this part may be outside of the periphery of the heads or between it and the center of the shafts.

To the adjacent ends of the shafts 1 standard flange coupling heads 4 are attached by keys 3 placed within their hubs 2. The coupling heads 4 form flanges that in conjunction with rings 6 and bolts 5 form clamping elements adapted to securely hold the elastic members 8 arranged in pairs as disclosed in Fig. 1. The adjacent ends of these members are held together by two-part clamping blocks 11 and they are assembled in radial relation as shown in Fig. 2 wherein six sets are instanced. The members 8 have a long and a short portion (Fig. 4) the former having a toe 10 and the latter a toe 9 both projecting inwardly. Recesses 7 are formed in rings 6 to receive toes 10 and similar recesses are formed in blocks 11 for toes 9. These are provided to assist in holding the members in radial relation to the center of shafts 1 thus relieving the bolts 5 of this duty and also assisting bolts 12 to hold them firmly together between the shaft end heads.

When a single elastic member 13 (Fig. 5) is used in the position disclosed in Fig. 3 its projecting toes 14 rest in recesses 7 formed in rings 15. The hubs 2 are adjacent each other and the shaft ends correspondingly closer than in Fig. 1. As assembled, the bows of the elastic members 13 extend outward similar to members 8 and they are clamped between flanges 4 and rings 15 by means of bolts 5.

An opposite position for the elastic members may be selected as shown in Fig. 6 wherein the bows of members 18 are found near the center. This type of member 18 is substantially the same as 13 with this exception that the toes 19 project toward each other (Fig. 10). As assembled the hubs 2 are on the outside in contrast to Figs. 3 and 7 where they are placed facing each other. Flanges 16 projecting from hubs 2 have rings 17 secured thereto by bolts 5. These rings (Fig. 8) are provided with recesses 20 in which toes 19 are seated. The adaptation instanced in Figs. 6 and 7 is the same except for the positioning of the hubs 2 which as heretofore stated are on the outside in Fig. 6 and on the inside on Fig. 7.

Figs. 11 and 12 are diagrammatic representations of hypothetical out of alinement positions of the shafts 1. In the former the shafts are in angular relation to each other, while in the latter they are " off center." The dotted lines 28 of both figures show the position the elastic members would naturally take if not subjected to stresses due to unalinement.

Coupling heads 4 and hubs 2 (Fig. 3) are parts ordinarily found in rigidly connected couplings using the same bolt holes, etc., as when a pair of flanges 4 are bolted to each other (Fig. 15) thus making a most simple, compact and efficient flexible coupling which admits of easy repairs when needed.

When the elastic members project radially outward, or even if projecting inward, they are made safe by means of suitable guards, two types being instanced in Figs. 13 and 14. In Fig. 13 flanged casings 21 are secured at 24 to rings 15. One part 21 has a flange 22 of smaller radius than the other flange 23 which encircles the former. A clearance between the flanges admits of shafts 1 operating in unalined relation to each other and the casings rotating with the coupling. In Fig. 14 a stationary casing 25, with shaft openings 26 made in any suitable manner to be separable so as to admit of easy assembling is shown. Supports 27 hold casing 25 securely on the floor, the ceiling or an adjacent wall.

It should be understood that an extension of the recesses 20 radially so as to partially embed the ends of the elastic members would in part be a substantial functional equivalent of the recesses shown even though the projections 9, 10 or 14 were omitted and dependence placed entirely on the side walls of such recesses to assist the bolts 5 in overcoming any tendency to twist when under severe load shocks. In this connection it is important that the structure of the elastic members be kept as intact as possible without the use of perforations of any kind whatever hence no weakness can develop in these parts at the point where they are fastened.

What I claim is,

1. In flexible couplings, a series of elastic members, terminal connectors to adjacent shaft ends, and means for securing the elastic members between such connectors independently of each other by clamping their ends to the connectors and providing coöperating abutting means adapted to engage the ends of the elastic members and prevent their twisting.

2. A flexible coupling comprising separate terminal members for each shaft end, radially placed elastic connectors adapted to reach across the space between such members, and means for securing the connectors to said members by clamping them while their ends engage abutments on said members whereby the shafts will transmit rotative effort across the connectors when in or out of alinement with each other.

3. In flexible couplings, shafts, terminal members secured thereon to rotate therewith, a series of independently supported connectors having elastic portions attached to the terminal members with the elastic portion nearer the axis of rotation than their points of attachment to the terminal members, said terminal members coöperating with the ends of the connectors for holding them against displacement.

4. In flexible couplings, shaft end fastenings provided with recesses, separate elastic connectors having a recurving portion and projections formed at the tips thereof said projections adapted to enter the recesses, and means for supporting the connectors adjacent such projections.

5. In flexible couplings, standard flange coupling parts adapted to be directly connected to each other when a rigid coupling is desired, flexible connectors placed therebetween, clamping members adapted to hold the connectors to the parts when a flexible coupling is required, the ends of the connectors and the coupling parts having coöperating means adapted to prevent the connectors being displaced.

6. In flexible couplings, suitable shaft end heads, radially placed elastic connectors joining the heads, the heads having abutments adapted to hold the connectors against rotation independently of the heads, and means for securing the connectors to the respective heads.

7. In flexible couplings, a pair of shaft heads having engageable hub flanges and openings through both flanges in register with each other so that bolts may be passed therethrough for securing them together when a rigid connection is desired, separate clamping rings having openings therein and adapted to engage the flanges of the heads when assembled on the shafts with the hubs projecting toward each other, independent elastic connectors radially placed between the clamping rings and the heads, bolts projecting through the registering holes for securing the heads, rings and connectors in operative relation to each other to form a flexible coupling, suitable means for holding the heads on the shafts, and means coöperating with the ends of the connectors adapted to prevent their twisting when subjected to sudden heavy loads.

In testimony whereof I affix my signature in presence of two witnesses.

WILLIAM B. HOSFORD.

Witnesses:
SAGE W. SCHUYLER,
WILLIAM L. CHANDLER.